Sept. 13, 1960 J. M. BARNOTHY 2,952,777
METHOD AND APPARATUS FOR INDICATING
RADIOACTIVITY PERCENTAGE RATIOS
Filed July 5, 1956 2 Sheets-Sheet 1
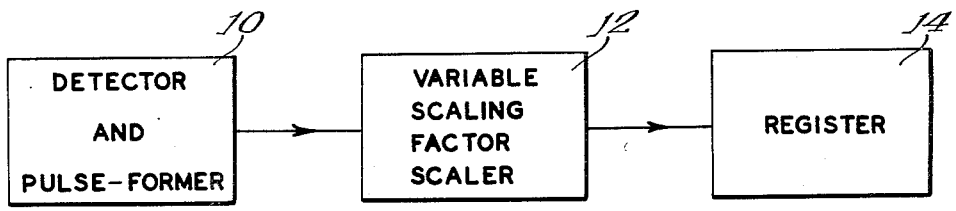
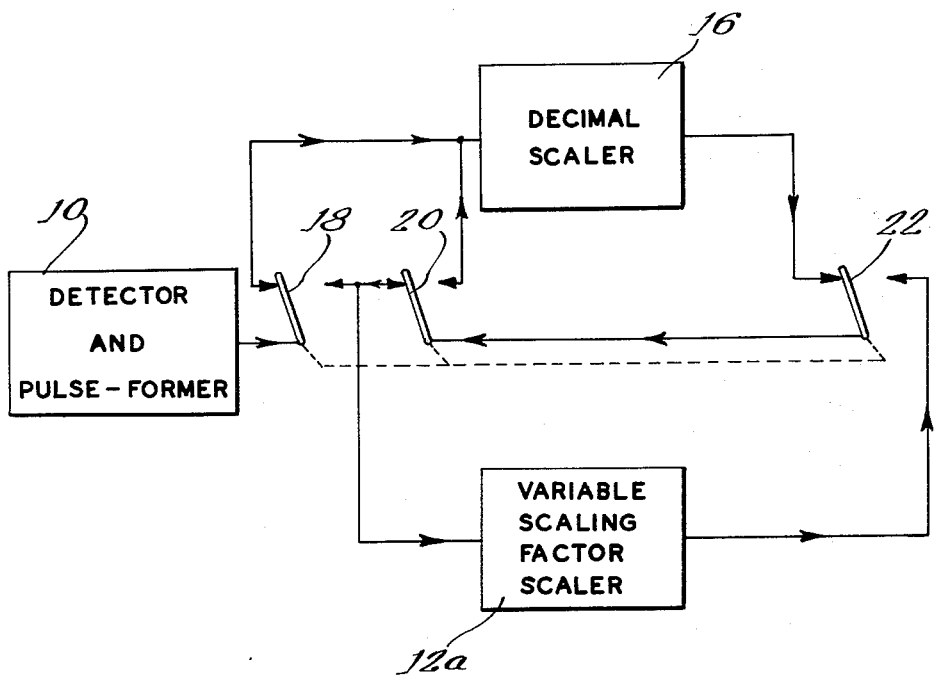
Inventor:
Jeno M. Barnothy
By: Leonard Nierman
Attorney

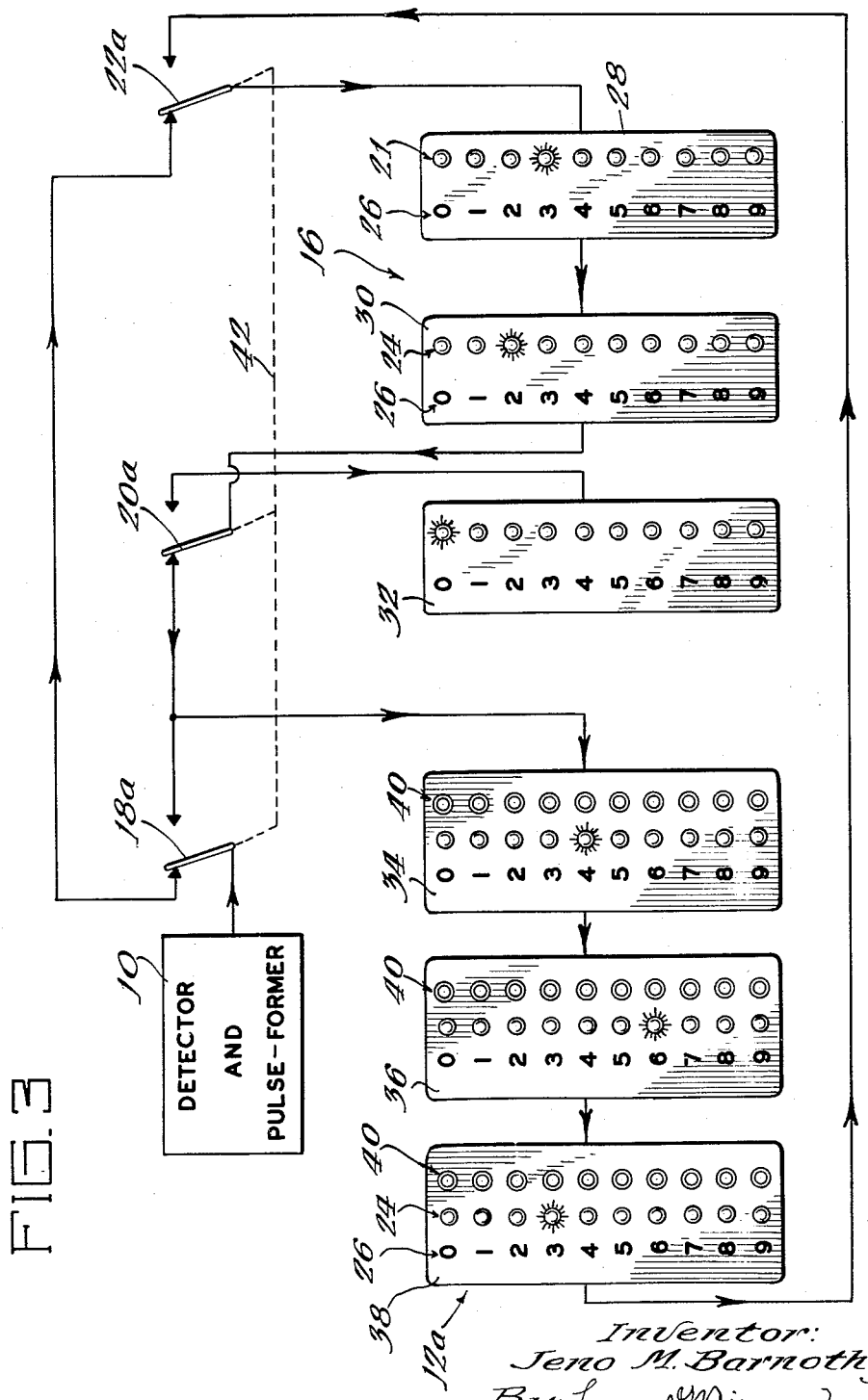

United States Patent Office

2,952,777
Patented Sept. 13, 1960

2,952,777

METHOD AND APPARATUS FOR INDICATING RADIOACTIVITY PERCENTAGE RATIOS

Jeno M. Barnothy, Evanston, Ill., assignor to Nuclear-Chicago Corporation, a corporation of Delaware Filed July 5, 1956, Ser. No. 596,010

8 Claims. (Cl. 250—83.3)

This invention relates to a method and apparatus for indicating the percentage ratio of the strength of one radioactivity field to the strength of another, or reference, field. More particularly the invention relates to methods and apparatus for producing such indications in which the indication is given on a scaler or other register device giving a fixed digital reading, rather than the statistically varying reading of averaging devices such as counting-rate meters. In addition, in its broader aspects, the invention may be employed for the measurement of the ratio of the rates of occurrence of any events which can be caused to appear as a series of electrical pulses.

In United States Patent No. 2,709,754, of William C. Davidon, there are described the advantages of methods and apparatus of this general type over methods and apparatus previously employed, and there is described one type of method and apparatus by which radioactivity percentage ratios may be measured and indicated with a minimum of effort and understanding by relatively inexperienced personnel, the method and apparatus therein described being so designed that such percentage ratio indications may readily be produced by persons unfamiliar with radioactivity and instrumentation for the measurement of radioactivity, such as medical and industrial personnel.

It is the principal object of the present invention to provide a method and apparatus for the same general purposes and objects as described in the above-mentioned patent, which present ease and simplicity of operation comparable to the devices therein illustrated, while at the same time permitting construction of the apparatus from well-known components, without the necessity of provision of special types of mechanical or electronic timers. The utilization of components which are in general use for other purposes in other types of apparatus, and the elimination of specialized equipment designed and constructed specifically for the particular purpose, result in substantial economies in production of the apparatus and practice of the method of the invention.

The present invention also provides the further advantage that the apparatus may readily be utilized to perform percentage ratio measurements where the individual measurements are separated by long periods of time, during which the apparatus may readily be utilized for other purposes. Thus with the present apparatus, the radioactivity field which is to serve as the standard (i.e. the field representing 100% strength) may be employed at any desired time to produce an intermediate indication as described below, and the apparatus may thereafter, irrespective of intervening use, be readily placed in condition to give a direct indication of the percentage ratio of the strength of another field to that of the original field. This feature is of particular advantage, for example, in measurements of decay of radioactive sources over long periods.

Further objects and advantages of the method and apparatus of the invention in the production of percentage ratio indications of radioactivity field strength in the comparison of samples, time variation of sample strength, percentage absorption indications, and similar applications wherein relative, rather than absolute, values are involved, will become apparent from the description of the method and apparatus which is illustrated by the appended drawing. The utility of portions of the device in the measurement of ratios of rates of occurrence of events other than radioactive disintegrations will likewise be seen. In the drawing:

Figure 1 is a block diagram of a simple form of apparatus facilitating understanding of the manner of practicing the invention with more advanced forms of apparatus;

Figure 2 is a block diagram of apparatus for practice of the method of the invention in which the operation of producing the indication is eased from the standpoint of the operator; and Figure 3 is a more or less pictorial block diagram of a modification of a particular form of the apparatus of Figure 2.

The apparatus of Figure 1, illustrated to facilitate understanding of the manner of practice of the method of the invention with more advanced forms of apparatus to be described, consists in all respects of units of equipment which are well known and generally available. The detector and pulse-former 10 consists of a pulse-producing radiation detector, such as a Geiger counter or scintillation counter, together with a pulse-height selector and equalized-pulse-producing circuit such as are commonly employed in the measurement of radioactivity. Although in general the pulse-forming unit will not employ a scaler, it will be seen that operation of the method will not be prevented by such incorporation, so long as the pulses produced remain proportional in rate of occurrence to the field strength. The output of the detector and pulse-former unit 10 is fed to a variable scaling factor scaler 12. As herein used the term "variable scaling factor scaler" refers to the type of device in which provision is made for selection by the operator of any of a large number of scaling factor (i.e., ratios of number of output pulses to number of input pulses), the scaling factor variation being continuous in that successive integers may be selected as scaling factors over a substantial range. Such scalers may, as is well known, be designed in a variety of ways, as, for example, by the provision of suitable manual switches for feed-back or pulse insertion circuits which vary the inherent scaling factor by preactuating stages of the scaler each time the scaler completes a cycle of operation. The variable scaling factor scaler of Figure 1 should have a maximum scaling factor of at least 100, and preferably of at least 1000. Persons skilled in the art will readily construct a variety of such scalers, which are therefore not illustrated as regards details of construction; should it be desired to avoid such construction, such scalers are commercially available from Berkeley Division, Beckman Instruments, Richmond, California, as Model 5426 preset counter, or the stages for such scalers may be constructed from the Model 730 preset decimal counting unit of the same manufacturer.

The register 14 of Figure 1 may be an electro-mechanical register of the type commonly employed with radiation counting equipment to record the output pulses from a scaler, or may itself be a scaler provided, as is conventional, with neon bulbs or other indicators giving a visual indication of the number of pulses received.

To produce an indication of radioactivity ratios, the detector 10 may be first exposed to the reference or 100% field to produce electrical pulses proportional in rate of occurrence to the strength thereof, with the scaling factor of the scaler 12 set to a decimal value (i.e. a value which is an integral power of 10). The pulses may be scaled over a suitable predetermined time (the timing normally being accomplished by a timer switch, not shown), the number of pulses produced by such scaling being registered on the register 14. If the scaling factor of the scaler 12 is set to the value indicated on the register 14 in the first counting operation, and both the scaler 12 and the register 14 are then reset to zero, and thereupon the detector 10 is exposed to the second field to produce electrical pulses proportional in rate of occurrence to the strength of the second field, and scaling of these pulses occurs over the same time interval previously employed, the scaled pulses being registered on the register 14, the number of pulses indicated on the register 14 will be a direct indication of the percentage ratio of the strength of the second field to that of the first. If the scaling factor employed on the scaler 12 in the first counting operation was 100, the percentage reading on the register 14 will appear in the form of whole digits, no decimals appearing. The percentage indicated on the register 14 will be carried to one decimal place for each power of ten beyond the second power employed as the scaling factor of the scaler 12 in the first counting operation. The inherent possible error of the indication (neglecting, of course, statistical fluctuations in pulse occurrence) is that due to the unrecorded remainder on the scaler 12, which is not recorded on the register 14 in either of the counting operations. If the register 14 is of sufficient capacity, such a system will readily register percentages in excess of 100, the maximum ratio of strength of the second field to that of the first field which is capable of being indicated being limited only by the capacity of the register 14 and the resolving power or losses of the scaler employed.

It will be seen that this result is achieved by the relation that, if A represent the number of pulses produced in the fixed time in response to the standard sample, and B the number produced in response to the unknown sample, the register indication in the first counting operation is $A/10^n$, and that in the second counting operation $B/A \times 10^n$. When $n$ is greater than unity, the result may be read directly in percent, and, where $n$ is greater than two, in decimal portions of a percent.

A simple numerical example will be helpful in understanding such operation of the apparatus of Fig. 1 and thus in understanding the operation of the apparatus later to be described, specifically designed for carrying out the method of the invention. Suppose that the reference field, for example the field produced by a reference sample, produces 36,423 pulses in the preset time interval, for example 3 minutes. Suppose further that during this interval the scaling factor of the scaler 12 is set at 100. The indication on the register after the 3 minute counting interval will be 364. The scaling factor of the scaler 12 is now set at 364 and all of the elements are reset to zero. Suppose that the detector 10 is now exposed to an identical field for 3 minutes. The indication on the register 14 at the end of this period will be 100, indicating that the second field is 100 percent of the first. Suppose that the detector is now exposed to another field, for example the field from another specimen producing a total count of (taking an arbitrary figure) 13,474. The scaling factor of the scaler 12 is left at 364. The number registered on the register is 37, indicating that the sample under measurement has radioactivity of a strength of intensity of 37% of that of the sample first measured. Any number of samples or fields may be measured for comparing intensity with the first sample in the same manner.

It may be noted that although, in the discussion of this example, the absolute values of the number of counts recorded in each counting operation were set forth, these numbers need not be observed or recorded by the operator in the performance of the method. The only numbers of significance to the operator are the number which appears on the register at the end of the first counting operation, which is then made the scaling factor of the scaler in subsequent counting operations, and the number appearing on the register at the end of each of the later counting operations, which is a direct indication of the percentage ratio desired. In the event that the operator wishes to measure such percentage ratios over relatively long periods, with the possibility of using the apparatus for other purposes between the measurements, it is merely necessary to record the number appearing on the register in the first measurement (364 in the example given) and thereafter the ratio of the activity of any other field can be indicated directly as a percentage by merely setting the scaler to the scaling factor thus identified with the original field, and scaling the resultant pulses for the same time.

In the described mode of operation of the conventional apparatus of Figure 1, at the conclusion of the first or standard counting operation, the reading of the register is transferred over to the scaler to become the scaling factor for the subsequent percentage ratio measurements. In Figure 2 is illustrated a method and apparatus wherein the transfer of the result from one portion of the equipment to another is avoided, the portion of the device serving as the register in the first or standard counting operation serving as the scaler in the subsequent counting operations. In the device of Figure 2, a detector and pulse former 10 and a variable scaling factor scaler 12a are employed as in Figure 1. A decimal scaler 16 having a scaling factor of 100 or a further power of 10 is employed in the system of Figure 2. (Such a decimal scaler may of course be employed as the register 14 of Figure 1, but in the device of Figure 1, the scaling ability of the register 14, if it exists, is not utilized, since the device of Figure 1 is not designed so that the number of pulses impressed on the register 14 ever exceeds its capacity of self-contained direct indication.) In the system of Figure 2, coupling between the detector 10, the scaler 12a, and the scaler 16 is achieved selectively by means of ganged switches 18, 20 and 22. In one position of the switches, the detector and pulse-former 10 is coupled to the input of the decimal scaler 16 by the switch 18, and the output of the decimal scaler 16 is coupled to the input of the variable scaling factor scaler 12a by switches 20 and 22. It will be seen that in this switch position the system is equivalent to the condition of the apparatus of Figure 1 which was described above as being employed for the standard or reference counting operation, the decimal scaler 16 being equivalent in function to the variable scaling factor scaler 12 of Fig. 1 when the latter is set up to have a decimal scaling factor, and the variable scaling factor scaler 12a of Figure 2 in this switch position acting as a register upon which the scaler output pulses are recorded. At the conclusion of the standard or reference counting operation, in the system shown in Figure 2, the number of pulses recorded on the scaler 12a during the counting operation is made the scaling factor of the scaler 12a. (As in Figure 1, of course, the time of counting is selected so that in the reference or standard counting operation, the number of pulses recorded on the scaler 12a does not exceed its capacity.)

When the ganged switches 18, 20 and 22 are manually thrown by the operator to their opposite position (not illustrated), the detector 10 is coupled to the input of the variable scaling factor scaler 12a by the switch 18, and the output of the scaler 12a is connected to the input of the decimal scaler 16 by the switches 20 and 22. In this condition of the circuit, then, the device of Figure 2 is again analogous to the device of Figure 1, with the scaler 12a now serving the same function as the scaler 12, and the decimal scaler 16 serving the same function as the register 14 of Figure 1, the number of pulses recorded on the decimal scaler 16 in response to a second field constituting a direct indication of the percentage ratio of the strength of the second field to that of the first. The practice of the method of the invention with the devices of Figures 1 and 2 is therefore quite similar, except that in the device of Figure 2, the scaler 12a is used in a manner analogous to the register 14 of Figure 1 in the first counting operation and in a manner analogous to the scaler 12 of Figure 1 in subsequent counting operations, so that it is merely necessary to set the scaling factor of the scaler 12a equal to the number of pulses impressed thereon. Equipment may be devised to accomplish this transfer in automatic fashion, upon the pressing of a single button. However such a system is relatively complex and expensive, although providing the great advantage that the operator need not (unless the apparatus is to be used for other purposes between successive measurements) make any observations or record of the numerical indication of the scaler 12a at the termination of the first or reference measurement.

In Figure 3 there is illustrated a form of the device of Figure 2 which eliminates the necessity of such observation or recording of the intermediate result obtained at the end of the first counting operation but yet avoids the complexity required of a system wherein the transfer of the number first registered to a scaling factor is accomplished in completely automatic fashion.

In the device of Fig. 3, the decimal scaler 16 is of the conventional indicator type, each stage having a column 24 of successive indicator lights, each opposite a numeral in the adjacent numeral column 26. The stage 28 physically placed at the right is the input stage, and the stage 30 is the output stage, the number of pulses recorded on the stage (in addition to complete cycles of operation) being thus directly readable from the indicator lights. An additional stage 32 is employed in the embodiment of Figure 3 for purposes later to be described.

The variable scaling factor scaler 12a is made up of three cascaded scaler stages of the type used for producing a variable scaling factor, such as the commercially available scalers described above. The three successive stages 34, 36 and 38 of the variable ratio scaler 12a are generally similar to the ordinary decimal scaler stages of the scaler 16, except that each stage, in addition to the column of indicator lights 24 and the column of legend numerals 26, has a corresponding adjacent column of manually operable switches 40. As is well known to persons familiar with scaling and counting apparatus, and devices marketed for such purposes, these scaler stages are so designed that the scaling factor may be selected at will by pressing the desired combination of push-button switches on the various scaler stages. There being three decade stages, the maximum scaling factor in the instance shown is 1000 (all stages set to "0"). An overall scaling factor of, for example, 543 is produced by pressing the button opposite numeral "5" in the hundreds stage 38, pressing the bottom opposite "4" in the tens stage 36, and pressing the button opposite the numeral "3" in the units stage 34. The manner in which this mode of operation is achieved is not described herein, being known in the art and constituting no part of the present invention, and being incorporated in commercially available equipmet. As in Figure 2, switches 18a, 20a and 22a, ganged as indicated by the dotted line 42, serve to place the circuits in either of two operating conditions. It will be seen that the switches 18a, 20a and 22a, although slightly rearranged in connections, serve the same basic function as the switches 18, 20 and 22 of Figure 2, with a modification later to be described.

In the position for counting the standard or 100% radio-activity field (the position illustrated), the pulses from the detector and pulse-former 10 are fed to the input of the first stage 28 of the decade scaler 16 (employed as a simple numerical register) and the output from the output stage 30 of the scaler 16 is fed to the input of the first stage 34 of the variable scaling factor scaler 12a. The drawing schematically shows the conditions of the scalers 12a and 16 on the conclusion of such a standard counting operation in which the reference field has produced in the detector 36,423 pulses in the preset time interval (the same numerical example discussed above in connection with Figure 1). In order to prepare the system for a percentage counting operation on another field, all that is required of the operator is to press, on each of the stages 34, 36 and 38, the button in the respective column 40 which is opposite the indicator light which is lit, and then reverse the condition of the switches 18a, 20a and 22a. Thereupon, after resetting of all of the scaling circuits to zero (as is conventional in the operation of scaling circuits and as may, of course, be accomplished by a suitable switch ganged with the switches illustrated), a subsequent counting operation for the same interval will produce upon the decimal scaler 16 (serving as a register in this operation) a direct indication of the percentage ratio of the radioactivity of the second field to that of the first. The stage 32 is a hundreds stage added to the two stage decimal scaler 16 for the second part of the operation, in order to extend the range of the decimal scaler 16 beyond 100 and thus enable the system to indicate the percentage ratios properly even though the strength of the second field is greatly in excess of that of the first field.

It will be noted that the numerical designations in the columns 26 on the stages 34, 36, and 38 are not used by the operator for any purpose unless intervening and unrelated uses are made of the apparatus, and these numerical indicia may accordingly be omitted in apparatus not designed for such intervening uses. By the same token, no substantial loss of convenience of use is incurred if the variable ratio scaler stages are not decimal, so that binary or other maximum scaling factor stages may be employed; any desired designations or markings may be provided in such a case to permit the recording of readings, and thus permit such intervening use of the apparatus for other purposes.

Needless to state, the teachings of the invention are not limited to the particular embodiments illustrated and described. Persons skilled in the art will, upon study of the invention, devise a large number of variants, some fairly obvious and others apparently only after study, which, although in some instances far different in details of construction and exact mode of operation, nevertheless utilize and incorporate the basic teachings of the invention. The application of the principles described above as applied to the measurement of radioactivity can easily be seen in the measurement of other events or quantities producing electrical pulses. Accordingly, the scope of the invention should not be considered to be limited by the particular embodiments illustrated and described, but should be limited only by the description of the invention contained in the appended claims.

What is claimed is:

1. The method of indicating radioactivity percentage ratios comprising the steps of producing electrical pulses proportional in rate of occurrence to the strength of a first radioactivity field, scaling the pulses by a decimal factor over a preset time interval while registering the number of pulses produced by such scaling, and then producing electrical pulses identically proportional in rate of occurrence to the strength of a second radioactivity field, and scaling these pulses over the same time interval by a factor equal to the number so previously registered, while registering the number of pulses produced by such latter scaling, whereby the latter registering constitutes a direct indication of the percentage ratio of the strength of the second field to that of the first.

2. The method of indicating radioactivity percentage ratios comprising the steps of producing over a preset time interval electrical pulses proportional in rate of occurrence to the strength of a first radioactivity field, feeding the pulses so produced to the input of a decimal scaler, feeding the output of the decimal scaler to the input of a variable scaling factor scaler, and then setting the scaling factor of the latter scaler to equal the number of pulses impressed thereon during said preset time, and thereupon producing over an identical time interval electrical pulses identically proportional to the strength of a second radioactivity field, feeding the pulses so produced to the input of the variable scaling factor scaler, and feeding the output of the latter scaler to the decimal scaler, whereby there is produced on the decimal scaler a direct indication of the percentage ratio of the strength of the second field to that of the first.

3. Apparatus for measurement of radioactivity percentage ratios comprising a radiation detector adapted to produce electrical pulses proportional in rate of occurrence to the strength of a radioactivity field, a variable scaling factor scaler, a decimal scaler, and switching means operatively coupled to said detector and scalers and having a first position wherein the input of the decimal scaler is coupled to the detector and the output of the decimal scaler is coupled to the input of the variable scaling factor scaler and a second position wherein the input of the variable scaling factor scaler is coupled to the detector and the output of the variable scaling factor scaler is coupled to the input of the decimal scaler, whereby a first radioactivity field may be counted for a predetermined time in the first position of the switching means, and a second radioactivity field may be counted for the same time in the second position of the switching means with the variable scaling factor scaler set by the operator to a scaling factor equal to the number of pulses recorded on the variable scaling factor scaler during the first counting operation, so that the number of pulses recorded on the decimal scaler during the second counting operation is a direct indication of the percentage ratio of the strength of the second field to that of the first.

4. The apparatus of claim 3 wherein the variable scaling factor scaler is of the type comprising a plurality of cascaded single stages, each stage having indicators indicative of the pulses recorded on the stage and manually operable switching members adjacent to each indicator constructed and arranged to set the scaling factor of the stage equal to the number of pulses recorded on the stage, whereby the operator may operate the device without the necessity of reading the numerical indication of the variable scaling factor scaler.

5. The method of indicating the ratio of rates of occurrence of two series of electrical pulses comprising the steps of scaling the pulses of the first series by a decimal factor over a preset time interval while registering the number of pulses produced by such scaling, and then scaling the pulses of the second series over the same time interval by a factor equal to the number so previously registered, while registering the number of pulses produced by such latter scaling, whereby the latter registering constitutes a direct indication of the percentage ratio of the rate of occurrence of the second series of pulses to that of the first.

6. The method of indicating the ratio of the numbers of pulses in two groups of electrical pulses comprising the steps of feeding the pulses of the first group to the input of a decimal scaler, feeding the output of the decimal scaler to the input of a variable scaling factor scaler, and then setting the scaling factor of the latter scaler to equal the number of pulses impressed thereon by said first group of pulses, and thereupon feeding the pulses of the second group to the input of the variable scaling factor scaler and feeding the output of the latter scaler to the decimal scaler, whereby there is produced on the decimal scaler a direct indication of the percentage ratio of the number of pulses in the second group to that in the first.

7. Apparatus for measurement of the percentage ratios of groups of pulses comprising an input circuit, a variable scaling factor scaler, a decimal scaler, and switching means operatively coupled to the input circuit and the scalers and having a first position wherein the input of the decimal scaler is coupled to the input circuit and the output of the decimal scaler is coupled to the input of the variable scaling factor scaler, and a second position wherein the input of the variable scaling factor scaler is coupled to the input circuit and the output of the variable scaling factor scaler is coupled to the input of the decimal scaler, whereby a first group of pulses may be counted in the first position of the switching means and a second group of pulses may be counted in the second position of the switching means with the variable scaling factor scaler set by the operator to a scaling factor equal to the number of pulses recorded on the variable scaling factor scaler during the first counting operation, so that the number of pulses recorded on the decimal scaler during the second counting operation is a direct indication of the percentage ratio of the number of pulses in the second group to that in the first.

8. The apparatus of claim 7 wherein the variable scaling factor scaler is of the type comprising a plurality of cascaded single stages, each stage having indicators indicative of the pulses recorded on the stage, and manually operable switching members adjacent to each indicator and constructed and arranged to set the scaling factor of the stage equal to the number of pulses recorded on the stage, whereby the operator may operate the device without the necessity of reading the numerical indication of the various scaling factor scaler.

References Cited in the file of this patent

UNITED STATES PATENTS

| | | |
|---|---|---|
| 2,709,754 | Davidon | May 31, 1955 |
| 2,739,242 | Armistead | Mar. 20, 1956 |
| 2,740,091 | Goulding | Mar. 27, 1956 |